US012601390B1

(12) United States Patent
Althen

(10) Patent No.: US 12,601,390 B1
(45) Date of Patent: Apr. 14, 2026

(54) ALL-GEAR SPEED CONTROLLER AND CONTINUOUSLY VARIABLE TRANSMISSION (CVT) USING HARMONIC HELICAL GEARS

(71) Applicant: Craig Louis Althen, Bozeman, MT (US)

(72) Inventor: Craig Louis Althen, Bozeman, MT (US)

( * ) Notice: Subject to any disclaimer, the term of this patent is extended or adjusted under 35 U.S.C. 154(b) by 0 days.

(21) Appl. No.: 19/372,789

(22) Filed: Oct. 29, 2025

(51) Int. Cl.
F16H 3/42 (2006.01)

(52) U.S. Cl.
CPC ................................... F16H 3/426 (2013.01)

(58) Field of Classification Search
CPC ...................................................... F16H 3/426
See application file for complete search history.

(56) References Cited

U.S. PATENT DOCUMENTS

| | | | | |
|---|---|---|---|---|
| 3,590,657 | A | * | 7/1971 | Cochrane, Jr. .......... F16H 3/426 74/570.3 |
| 4,047,451 | A | * | 9/1977 | Ackerman .............. F16H 3/426 74/665 GC |
| 5,490,433 | A | * | 2/1996 | Althen .................... F16H 3/363 74/342 |

* cited by examiner

*Primary Examiner* — Vicky A Johnson

(57) ABSTRACT

A heavy-duty, all-gear transmission using helical gears is disclosed as a CVT or IVT completely devoid of any frictional or hydraulic elements. By longitudinally moving the input member of a pair of rotating helical gears, and by varying the direction and extent of any superimposed, longitudinal motion, the rotation of the output member can be varied. When the longitudinal motion is generated with a reciprocating, harmonic mechanism, the speed of the output gear varies in a sinusoidal fashion. This novel mechanism employs the principle of combining two equal outputs with sine wave profiles of opposite phase in a differential to produce an averaged, linear profile. Altering the amplitude of any longitudinal translations results in variations in the final output.

1 Claim, 3 Drawing Sheets

ALL-GEAR SPEED CONTROLLER AND CONTINUOUSLY VARIABLE TRANSMISSION (CVT) USING HARMONIC HELICAL GEARS

BACKGROUND

1. Field of Invention

This invention relates to a continuously variable transmission (CVT) or an infinitely variable transmission (IVT) that uses helical gears instead of hydraulic or frictional elements to vary the transmission's speed ratios. The effective input of a helical gear varies if its rotational input is combined with simultaneous, longitudinal motion. This action alters the net speed of its input. By using two power pathways, and by using helical gears that have superimposed, variable, harmonic (sine wave) longitudinal motions, but with 180° phase differences, the two outputs can be averaged in a differential to provide smooth, linear output. This CVT is most efficient when used as a speed controller with its input/output centered about 1:1.

2. Prior Art

This invention is a direct successor to the applicant's original patent application for a geared CVT (Ser. No. 18/932,623 entitled "All Gear, Continuously Variable Transmission (CVT) Using Harmonically Driven Helical Gears"). No new or additional prior art is known to the applicant. This disclosure presents new and different forms, and suggests new and different functions. None of the original claims in application Ser. No. 18/932,623 apply to this disclosure, and none of the claims of this disclosure apply to the original patent application.

SUMMARY

The essential elements of this invention can be summarized in four parts:
a) The core elements and their interactions,
b) The coordination of the core elements,
c) The reciprocating drivers, and
d) An output means
a) The core elements consist of multiple sets of helical gears. The key underlying principle of their operation is that, if an input gear of a matching pair of helical gears is moved longitudinally at a speed that exactly coordinates with its rotational speed, it will simply screw its way along its axis with no input of any kind to the output gear. The output gear will remain idle with no rotational input and with no thrust input. Similarly, if a helical output gear is locked, and an input gear is free to slide longitudinally on a splined shaft, then turning the shaft will slide that input gear sideways in a screw-like motion. This transmission largely functions by controlling those tendencies. If there is no longitudinal motion, as is normal, the output speed is fixed. However, if some slow longitudinal motion is superimposed upon the rotational input in the same direction that could potentially result in a screwing reaction, then the output gear will turn at some reduced, intermediate rate. If the direction of the longitudinal thrust is reversed, the output speed is increased instead of decreased. Controlling the variation, the extent, and the direction of longitudinal inputs controls variation in the output speed.

The teeth of the input gears must encompass only half of the gear's circumference; the other half is smooth and incapable of any engagement. However, each half can be subdivided and rearranged. That is, a second subdivision would yield two sectors with teeth separated by two blank sectors without teeth. The four alternating sectors would encompass 90° each. Further subdivision would yield six alternating sectors (three toothed and three blank) at 60° each. In any case, the input gears always work in pairs. The two gears of the pair are offset in a complementary fashion so that the output gears are continuously engaged.

The advantage of having additional sectors is that the stroke length of the longitudinal oscillations is cut to one half or to one third. This makes the mechanism more compact. However, shortened strokes require more rapid oscillation cycles. The same number of teeth are engaged per 360° of revolution in any case. But, the superimposed, longitudinal cycles, back and forth, must coordinate: out—driving with toothed sectors and then back—recovering with blank sectors.

b) The coordination of the core elements must assure that the longitudinal motion of the input gears produces symmetrical, harmonic (perfectly sinusoidal) velocity profiles in the output gears. Again, the sectored gears always work as pairs. As either slowly decelerates and comes to the end of its sideways motion, so will the other. But at this moment, the coordination is such that each will come to the end of its rotating sector, one being toothed and the other blank. While they are thus momentarily paused, this is the point where the next, new sectors will engage or disengage. Then, the pair of sectored gears will slowly begin to accelerate together again in the opposite direction. These input and output gears represent the operational core.

c) Reciprocating drivers need to shuttle the sectored, input gears back and forth longitudinally. Many rotary-to-linear devices are capable of this function, and the selection is up to the design engineer. Some examples include: crank and slider (ideally using two Z cranks for perfect harmonic action), Scotch yoke, and swash plate-like mechanisms. Other devices, such as rack and pinions or rotary cams, are less suitable because of the difficulties related to varying their outputs.

The example used in this disclosure is a compound Scotch yoke, which intrinsically produces a harmonic (sinusoidal) output, has a readily adjustable stroke length, and is relatively compact. The stroke length is the key feature governing the speed of the input gears' lateral movements, thus, ultimately, the realized gear ratio.

d) Finally, two power pathways are needed for output, so that identical, sinusoidal fluctuations can have a 180° phase difference. If these rotate in the same direction, the replicate outputs can be averaged in a differential to produce a uniform, linear output.

BRIEF DESCRIPTION OF THE DRAWINGS

1. Figure Numbers

The features of the present invention, which are believed to be novel, are set forth with particularity in the appended claims. The invention, together with further objects and advantages thereof, may best be understood by reference to the following descriptions taken in conjunction with the accompanying drawings.

DETAILED DESCRIPTION OF THE DRAWINGS

Figures 1, 2:
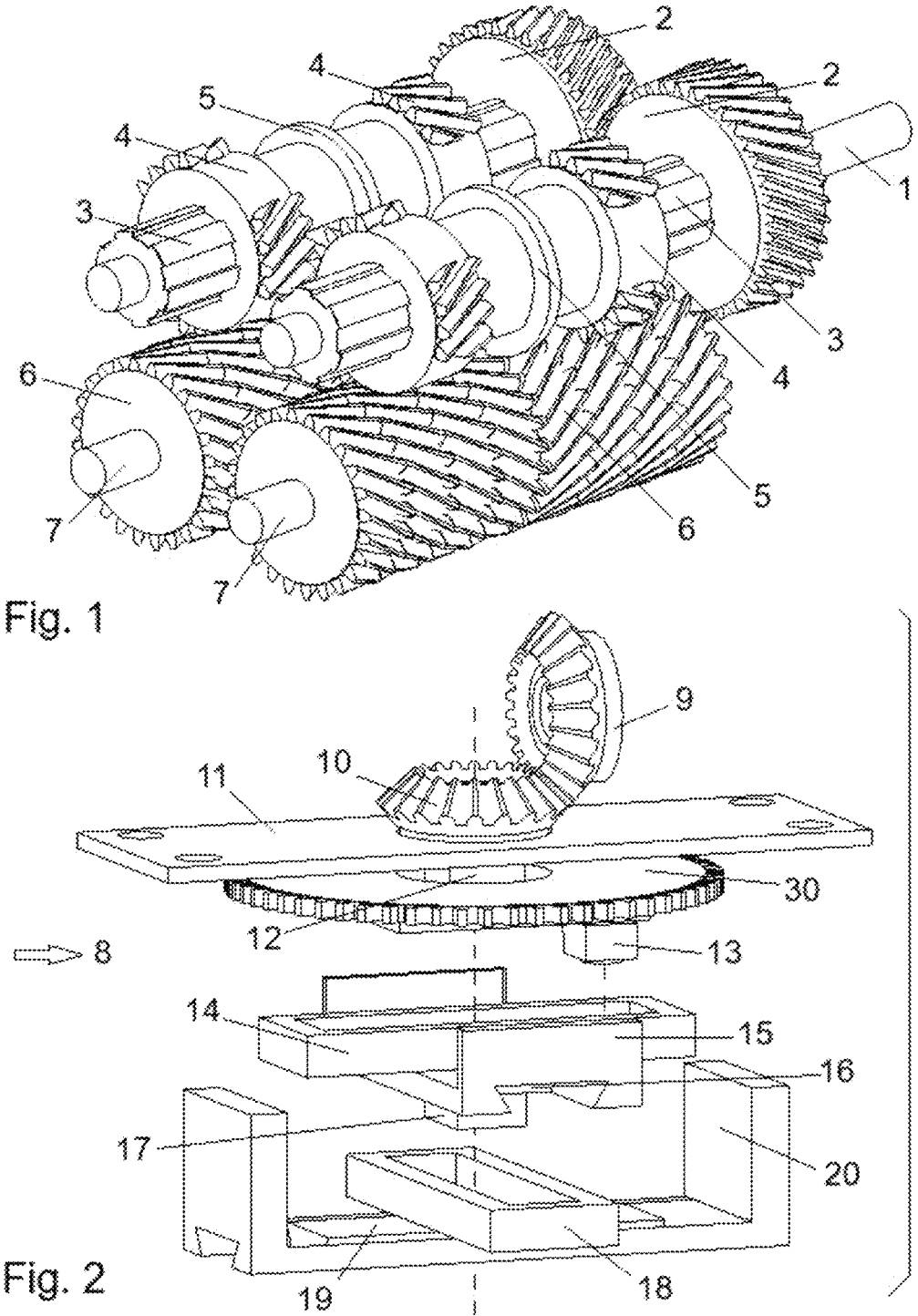
FIG. 1 Core mechanism.
FIG. 2 Exploded view of compound (adjustable) Scotch yoke.

FIG. 1 shows the core mechanism comprised of an input shaft (1) bearing an input gear (2). This is engaged with a second input gear (2) to provide two power pathways. Each input gear (2) bears an integrated splined shaft (3). Pairs of sectored gears (4) are free to slide back and forth longitudinally on these splined shafts (3). The two sectored gears (4) are mounted complementarily, so they function as a single gear driving an output cylinder (6). Since the sectored gears (4) shuttle back and forth, their mating output cylinders (6) must be extended laterally to accommodate them. These have teeth around their full circumferences. The sectored gears (4) are joined together in pairs by means of a hollow cylinder, which does not contact the splined shaft (3). These sectored gears (4) are essentially light-weight rings, each having an equal number of alternating toothed and blank sectors—generally totaling from two to six sectors. In this illustration, each sectored gear (4) has three toothed sectors and three blank sectors, so they are mounted with an offset of 60°. A single, shifting flange (5) at the midpoint of this unified structure assures their synchronous longitudinal movements. The two gears of each pair have oppositely-oriented teeth—one right-handed and one left-handed. These each engage different, complementary sections of their output cylinder (6).

Each output cylinder (6) has its own output shaft (7), and the two power pathways rotate in opposite directions, often at different speeds. That is because the longitudinal actions of the sectored gears (4) on each pathway are out of phase with one another. Although, the output cylinder (6) of each pathway could support multiple input pairs for added strength, none are shown in the drawings.

If, for example, one of the sectored gears (4) is presently engaged with its half of the output cylinder (6), then the other will be disengaged. Both can rotate in place, or both can move longitudinally together. If they were sliding, then just as one slowly decelerates and comes to the end of its sideways motion, so will the other. But at this moment, the coordination is such that each will also come to the end of its rotating sector, whether toothed or blank. At this point, while they are thus momentarily paused, the next sectors will engage or disengage. Then both sectored gears (4) will slowly begin to accelerate again in the opposite direction. This is where the oppositely-oriented teeth come into play. If the first gear had been screwing its way so as to slightly diminish its effective input, then the second gear must continue to replicate that action. But the second gear will then be going in the opposite direction, so the teeth also need to be reversed. If the teeth were not reversed, then moving the second gear in that opposite direction would add to, rather than subtract from, the rotary input. That would effectively cancel everything. So both gears of each pair add or subtract from the rotary input. However, to do so when moving in opposite directions, their teeth also must be oriented in opposite directions. Because the two pairs of sectored gears (4) rotate out of phase from each other, the rotation of their respective output pathways also rotate with the same 180° phase shift, if any.

FIG. 2 shows an exploded view of an adjustable Scotch yoke (8). The rotary input begins with a beveled input gear (9), which drives a beveled crank gear (10) and its crank (12) along with the crank's (12) primary pin (13). The primary pin (13) is cylindrical internally, but it is encased in a square, rotating jacket. All of these items rotate or cycle continuously at three times the rate of the input gears (2).

Since, in this example, the sectored gears (4) have three toothed sections and three blank (recovery) sections, the input speed must be three times faster than the basic input speed. This is necessary for each paired (toothed and blank) section to complete one full harmonic cycle, out-and-back, for any given rotation rate.

The crank (12) with its primary pin (13) continuously drives the primary yoke (14) back and forth, and always operates to its full, fixed extent. The primary yoke (14) includes an integrated primary slider (16) on its underside, which in turn is integrated with a jacketed, secondary pin (17). This primary, or first stage unit, is mounted and sandwiched within a primary yoke retainer (15), which is attached above to a moveable plate in the form of a Scotch yoke gear (30). The normally stationary Scotch yoke gear (30) can be pivoted through its teeth, allowing it and its elements to be reoriented and fixed at various angles with reference to the rigidly mounted base plate (11).

The secondary pin (17) drives the secondary yoke (18). But it only drives it to the extent of the cosine of the angle between the primary yoke (14) and the secondary yoke (18). So, if it is perpendicular at 90° (cos 90°=0), there is no movement. If it is parallel (cos 0°=1), then the secondary yoke and slider (18 & 19) move the full, maximum extent of the primary yoke's (14) range. Intermediate angles result in intermediate lengths in the range of motion.

The secondary yoke (18) along with its fixed secondary slider (19) can shuttle only back and forth parallel to the output cylinders (6). But the distance between its cycling end points depends upon the secondary pin's (17) range, which depends upon the primary yoke's (14) relative angle. The secondary yoke (18) and its elements are sandwiched into place by the secondary yoke retainer (20), which itself is fixed above to a stationary base plate (11).

The lengths of the strokes shuttling the sectored gears (4) back and forth can change relatively speaking from 0 to 1. The actual distances depend upon the various dimensions of the Scotch yoke (8), especially the crank (12). In the drawings of this version of the invention, the maximum is designed to be that distance that completely nullifies the rotary input, thus allowing for a potential gear ratio of 1:0. Consequently, this also permits a theoretical, high gear ratio of 1:2; however, neither extreme is recommended for extensive use. As discussed below, this invention is perhaps best used as a speed controller rather than as a transmission, per se. Although it could be coupled with a gear box, and operate only during gear changes to provide smooth transitions in an automatic (stepped) CVT.

Figure 3:
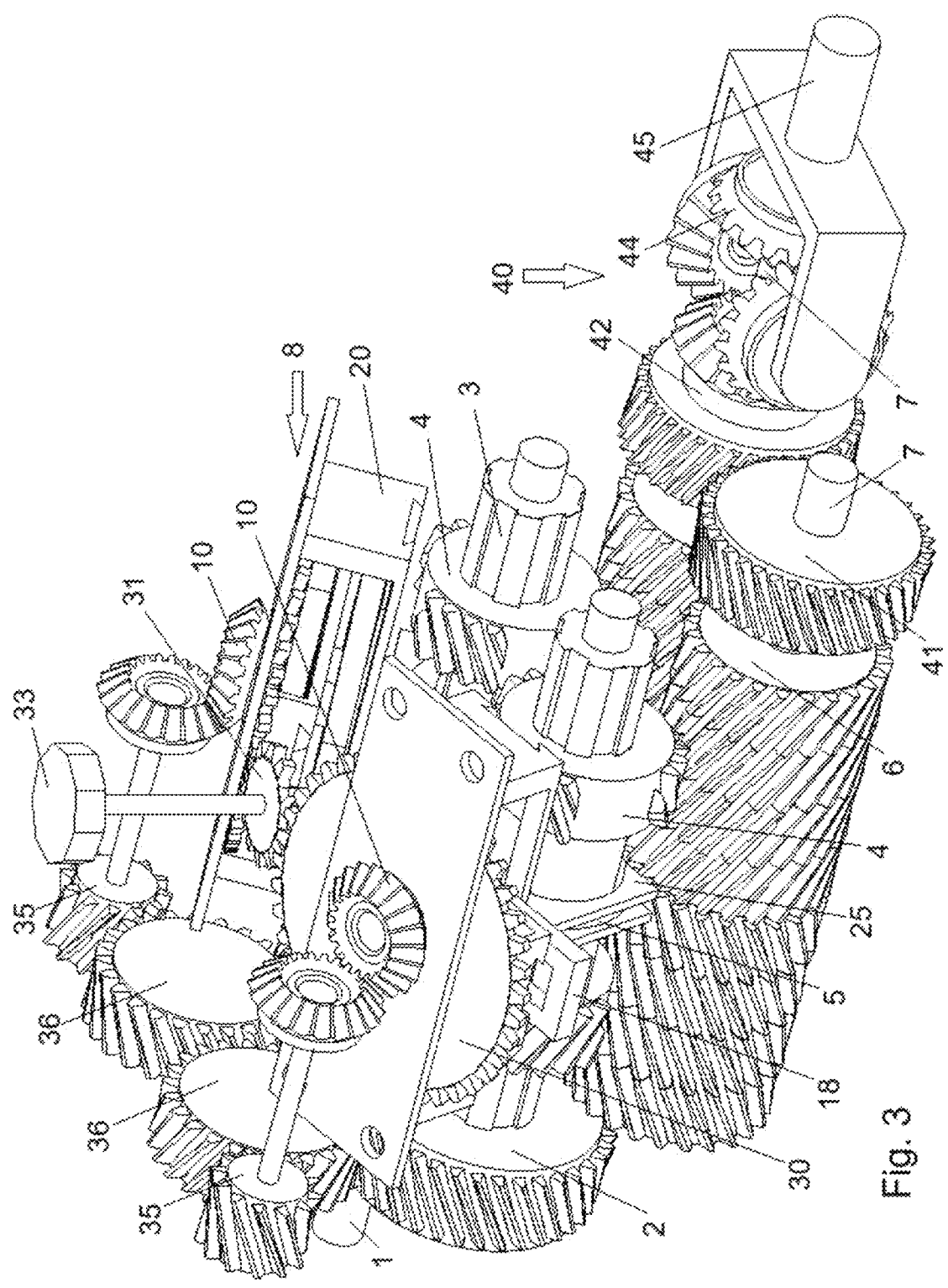
FIG. 3 Core mechanism with Scotch yoke and differential output

FIG. 3 shows all of the essential parts of the transmission or speed controller. In addition to the elements of FIG. 2, this includes a pair of Scotch yokes (8) complete with their associated input and output elements. This includes a pair of idler gears (36), which are used to drive a pair of input pinions (35) used to drive the pair of Scotch yokes (8). In this example, these are designed to turn at 3× the rate of the main input gears (2), as there are three sets of toothed and blank sectors on the sectored gears (4). Each reciprocating cycle of the Scotch yokes (8) must correspond with one pair of sectors on the sectored gears (4). That is, with the engaged half of the cycle having teeth, and, with the returning half of the cycle disengaged with a blank section. One full rotation of the sectored gears (4) corresponds to one rotation of the output cylinder (6), unless modified by longitudinal influences. But with three pairs of sectors, there must be three cycles. Another good option is to use four sectors on the sectored gears (4), in which case each Scotch yoke (8) would only need to turn twice as fast.

A pair of Scotch yokes (8) are required—one for each pathway, and these operate with a 180° phase difference. A static, control pinion (31) simultaneously adjusts both Scotch yokes (8) by rotating their Scotch yoke gears (30). When the control pinion (31) is turned, both Scotch yoke gears (30) are reset to a new fixed angle, and the stroke lengths are, in turn, modified. For illustrative purposes, the control pinion (31) is shown connected to a control mechanism (33) represented by a 9-sided knob that could be adjusted (and fixed) manually. In practice, this would be replaced by something like a worm gear pair controlled with a servo within a feedback circuit. Both Scotch yokes (8) are currently in the 'neutral' (1:1) position, and this corresponds to their primary yokes (14) (see sheet 3/3) being perpendicular and thus providing no reciprocating action. However, turning the control pinion (31) in either direction will initiate oscillations in the shifting forks (25). These are integral parts of the undersides of the secondary sliders (19) (see FIG. 2). The shifting forks (25) are scarcely visible in this view (see sheet 3/3, FIGS. 4 & 5). For visual simplification, the reinforcement struts of the shifting forks (25) are not shown in this view either, but these are clearly shown on the figures of sheet 3/3.

FIG. 3 also shows the differential (40) for combining the outputs of the two pathways. The visually nearer, second pathway turns its own output gear (41), which meshes (1:1) with a special compound gear consisting of a matching mate combined with a bevel gear. This unitized gear (42) is uniquely mounted on the output shaft (7) from the first pathway, but it spins freely and independently, forming an integral part of the differential (40). The other key input is the direct bevel gear (44) from the first pathway. This terminates and is firmly attached to the end of its own output shaft (7). Both of these bevel gears co-rotate in the same direction and at the same averaged sinusoidal speeds, but in cycles of opposite phases. They thus drive the two side gears and their bracket and the differential output shaft (45) at a uniform, averaged speed.

Sheet 3/3 shows a selection of plots for different settings of the Scotch yoke (8). It is important to note that these "sample values" for angular velocities strictly apply only to the specific configuration of the transmission depicted in the accompanying figures. A completely different set of values would be derived from various changes. These changes might include: the length of the output cylinders (6), the range of the reciprocating device, the angle of the helical teeth, the relative sizes of most gear pairs, and so on.

It is a minor point, but whether or not turning the primary yokes (14) clockwise or counterclockwise results in increasing or decreasing their output depends upon the direction of the rotation of the input shaft (1) and the orientation of the cranks (12) (see FIG. 2) during construction. That is, whether the cranks (12) were initially set to the left or to the right side when the primary yokes (14) were at their midpoints.

Figures 4, 4A, 5, 5A, 6, 6A, 7, 7A:
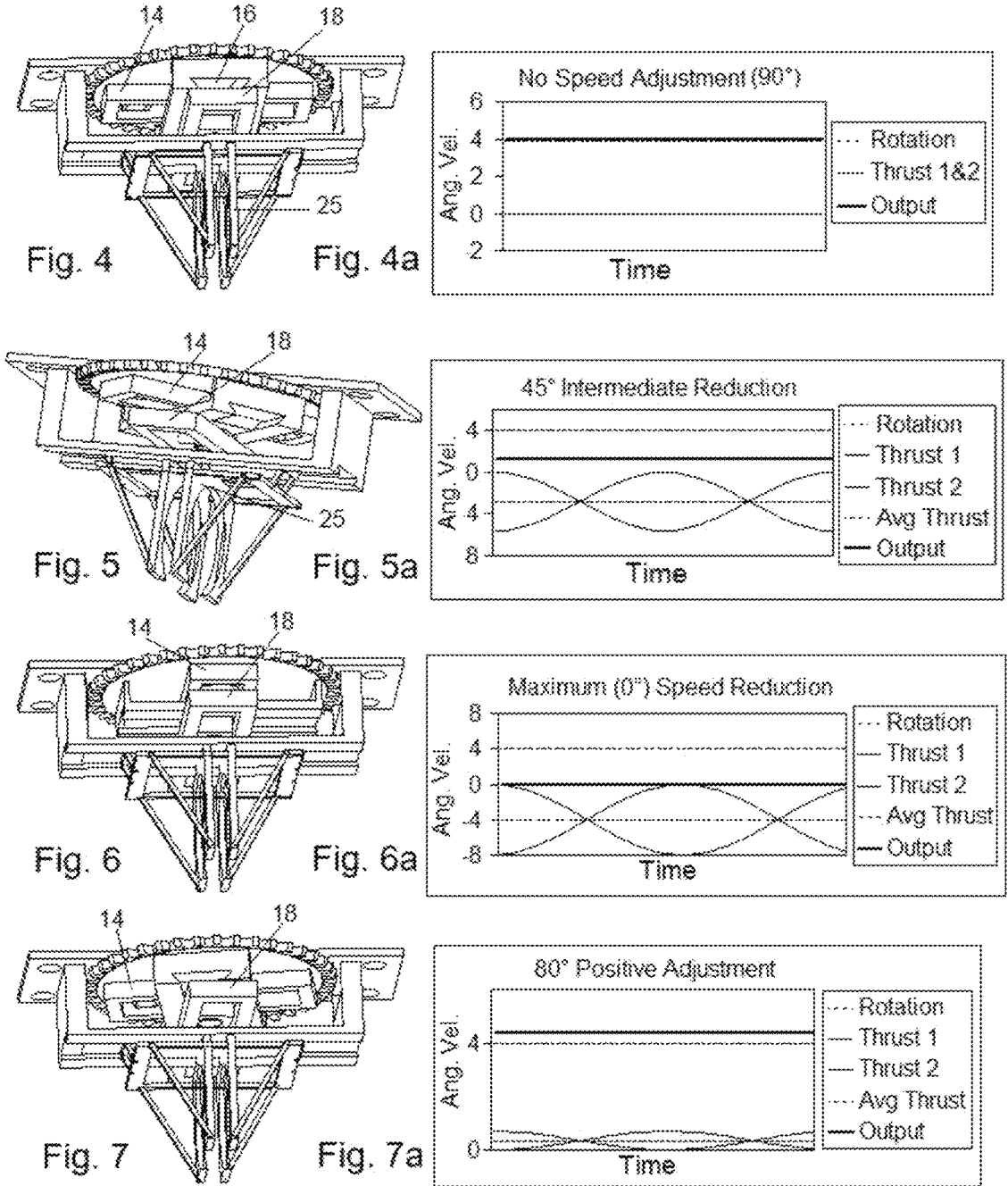
FIG. 4 Scotch yoke in neutral position (90°)
FIG. 4a Output plot of neutral position (1:1)
FIG. 5 Scotch yoke in intermediate reduction position (−45°)
FIG. 5a Output plot of intermediate reduction position (1:0.3)
FIG. 6 Scotch yoke in maximum reduction position (0°)
FIG. 6a Output plot of maximum reduction position (1:0)
FIG. 7 Scotch yoke in slightly positive position (80°)
FIG. 7a Output plot of slightly positive position (1:1.17)

FIG. 4 illustrates a view of a Scotch yoke (8) showing the additional elements of the complete shifting fork (25). As the secondary yoke (18) has a permanently fixed orientation, so is the orientation of its secondary slider (19) and its shifting fork (25). The shifting fork (25) only moves up and down the longitudinal axis, parallel to the splined shafts (3). Their only possible change is in their stroke length. This length is a function of the longitudinal range of the primary slider (16), and this depends strictly upon the relative angle between the primary yoke (14) and the secondary yoke (18). In FIG. 4, the primary yoke (14) is perpendicular to the secondary yoke (18), so their respective sliders are also perpendicular. In this case, the primary slider (16) with its secondary pin (17) simply runs up and down the axis of the secondary yoke (18) without providing any lateral impetus to move the secondary slider (19) and its shifting fork (25). The output cylinders (6) are still spinning, but the bearings (not shown) between the shifting flanges (5) and the shifting forks (25) feel no lateral pressure. The sectored gears (4) remain stationary longitudinally, and their rotation is unmodified—the output is simply 1:1.

FIG. 4a provides a plot for this configuration with a direct rotational input of 4 and with no added or subtracted thrust, i.e., 4−0=4. The units for the angular velocities are unspecified, but are equivalent to a rate that is proportional to the number of teeth that would be rotated in one-half of a longitudinal cycle.

FIG. 5 and FIG. 5a illustrate information equivalent to that of FIG. 4 and FIG. 4a, but with the primary yoke (14) rotated in the 'negative' direction to 45°. This rotation reduces the output to approximately 1:0.3.

The maximum stroke length for the dimensions and configuration of the illustrated transmission shown in all of the figures is 4.0. By design, this is the same as the rotational input per cycle, so that a null result is possible, i.e., 4−4=0. The stroke lengths are proportional to the cosine of the angle between the primary and secondary yokes (14 & 18). The cosine of 45° is 0.707, so the stroke length is about 0.7× 4=2.8. In running that distance, when reducing the output, the teeth must move at a reduced averaged speed of −2.8 teeth per half cycle, but actually the longitudinal velocity starts and stops with zero, with the relative speeds in-between describing a sine curve. The peak speed at midway must be twice the average speed (−5.6) in order to average −2.8. The graph shows the reduction curve for each pathway. The average of the two complementary waves is the prescribed speed of −2.8. And since this configuration is in the reducing, or subtracting, mode, the final speed is 4−2.8=1.2 and the output gear ratio is 1.2/4=0.3.

FIG. 6 and FIG. 6a show the situation when the primary yoke (14) is fully parallel to the secondary yoke (18) at 0° (cos 0°=1), which yields a 100% reduction in output and an I/O of 1:0. The output is completely nullified because, on average, the input teeth are effectively screwing themselves sideways at the exact speed necessary to prevent any input (4−4=0).

Finally, FIG. 7 and FIG. 7a present the case for a slightly positive output. In this instance, the primary yoke (14) is nudged (10°) in the opposite direction from perpendicular. Hence, the thrust adds instead of subtracting from 1, and the I/O equals 1:1.174, (Cos 80°=0.174; 0.174×4=0.696; 4+0.696=4.696; 4.696/4=1.174). The new gear ratio, if adding thrust, is 1+the cosine of the angle, and, if subtracting thrust, it is 1—the cosine of the angle (at least in this particular configuration). The maximum range is therefore from 1:0 to 1:2, but the extremes are scarcely to be recommended for any length of time. The gear ratio of 1:1 is clearly the most efficient. At the 1:1 ratio, the Scotch yoke (8) simply freewheels, and similarly as there is no longitudinal motion, the differential gears are also idle. The input is simply shunted through with no modification. It is for this reason, regarding efficiency, that Artificial Intelligence applications (AI) suggest that a needed and recommended use for this invention is as a speed controller, particularly for heavy-duty operations such as in large wind generators.

Apart from altering the number of sectors, it is possible to completely rearrange various core components and/or the reciprocating devices. For example, the two output cylinders (6) could be made only half as long, and have teeth in only one direction, each being identical, or possibly being a mirror image of one another. However, while this would significantly reduce the overall length, the overall girth would significantly increase because each output cylinder (6) would still have to have at least two sectored gears (4), each being alternately and oppositely engaged with their own reciprocating device to produce sequential cycles. And these have to maintain the 180° phase shifts between the pathways. That requires the equivalent of four reciprocating means, each with different timing. While one particular embodiment of the invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention.

I claim:

1. A continuously variable transmission suitable for use as a speed controller comprising:

a sequence of input gears dividing into two power pathways with each said pathway having two or more pairs of sectored gears capable of longitudinal reciprocating motions while engaged with a laterally extended output gear;

said sectored gears having one or more sectors bearing helical teeth and matched with an adjacent blank sector without teeth, with said sectors, toothed and non-toothed, alternating and being equal in number, and all said sectors encompassing equal angular dimensions around said sectored gears' circumferences;

said sectored gears operating in pairs, with said pairs being complementarily offset to provide continuous engagement with said laterally extended output gear;

said sectored gears having means of being variably driven with said longitudinal reciprocating motions in order to provide variable input into said laterally extended output gear of each said pathway due to intrinsic interactions from said helical teeth moving longitudinally;

with said longitudinal reciprocal motions being harmonic and resulting in sinusoidal outputs of 180° opposite phases in each said laterally extended output gear of each said pathway;

with uniform or said oppositely phased sinusoidal outputs from each said pathway being averaged in a differential to produce smooth, linear output.

\* \* \* \* \*